S. G. Peabody.
Cultivator.

72889

PATENTED
DEC 31 1867

Witnesses:

Inventor:
S G Peabody
per Attorneys

United States Patent Office.

S. G. PEABODY, OF CHAMPAIGN, ILLINOIS.

Letters Patent No. 72,889, dated December 31, 1867.

IMPROVEMENT IN CULTIVATORS.

*The Schedule referred to in these Letters Patent and making part of the same.*

TO ALL WHOM IT MAY CONCERN:

Be it known that I, S. G. PEABODY, of the city and county of Champaign, State of Illinois, have invented a new and improved Cultivator; and I do hereby declare that the following is a full, clear, and exact description thereof, which will enable those skilled in the art to make and use the same, reference being had to the accompanying drawings, forming part of this specification.

This invention relates to a new and improved cultivator, constructed principally of metal, and so arranged as to be capable of being used either as a single or double implement.

The invention consists in a peculiar construction of the device, as hereinafter fully shown and described, whereby a very strong, durable, and efficient implement of the kind specified is obtained, and one which may be readily adjusted to be drawn from place to place. In the accompanying sheet of drawings—

Figure 1:
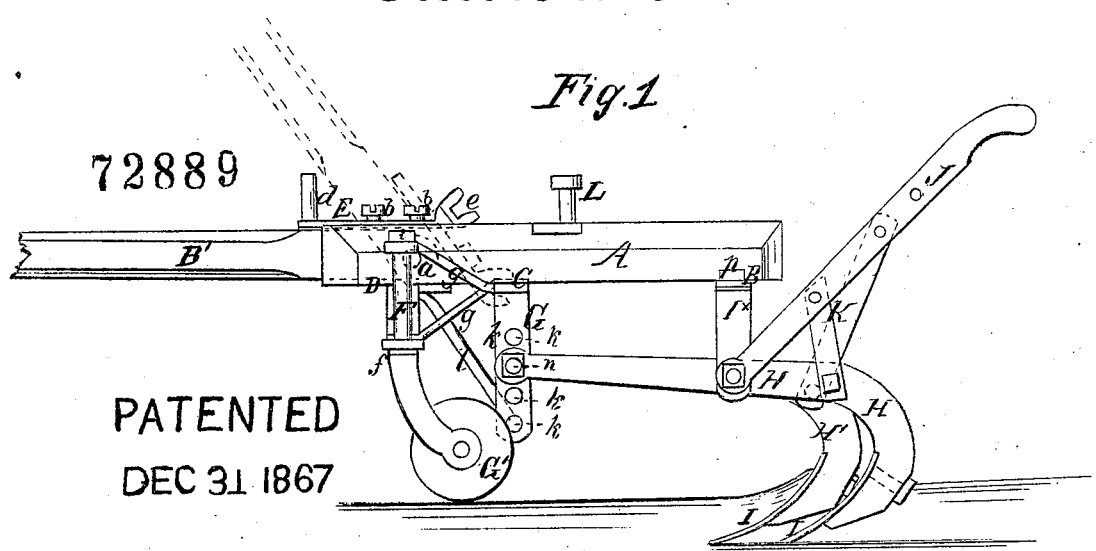

Figure 1 is a side view of my invention.

Figure 2:
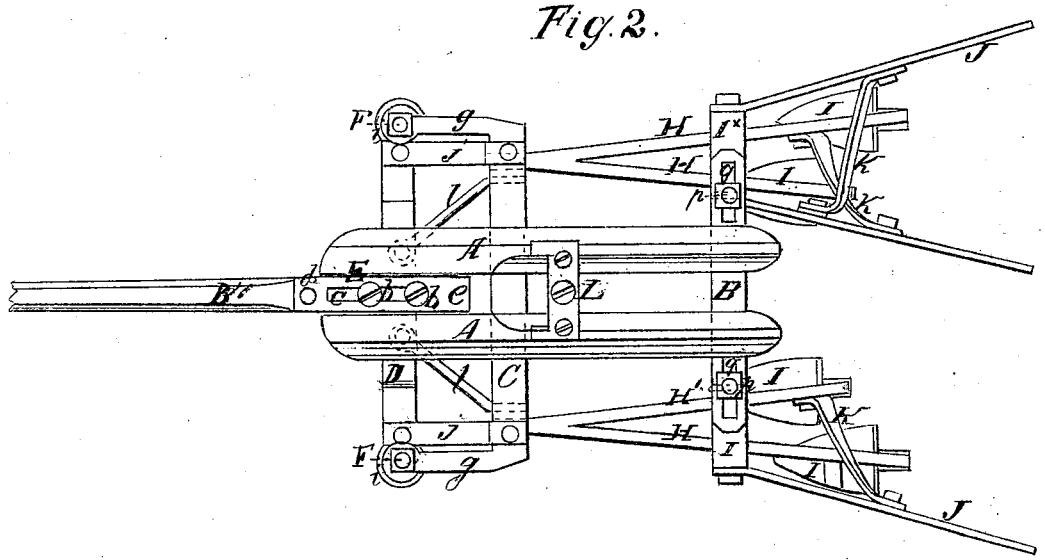

Figure 2, a plan or top view of the same.

Similar letters of reference indicate corresponding parts.

A A represent two parallel beams, which are connected, near their rear ends, by a metal cross-bar, B, and connected, near their front ends, by the metal bars C D. Between the front ends of the beams A A there is secured, by a bolt, $a$, a draught-pole, B', having a slide-bolt, E, secured to its upper surface by screws $b\ b$, which pass through a slot, $c$, in E, into the draught-pole. The front end of the bolt E is formed with an upright pin, $d$, for the convenience of moving it, and the rear end is formed with a fork, $e$, to catch or fit upon the front edge of the bar C, when the bolt is shoved back, and the draught-pole elevated, as shown in red in fig. 1. The bolt E secures the draught-pole in this position, and when said pole is drawn down, and the team attached to the implement, the ploughs at the rear of the same will be elevated above the ground, and the implement may consequently be readily drawn from place to place.

The implement may be adjusted in this way, when the team is hitched before it, by simply elevating the rear of the implement, and shoving the slide bolt E back to catch over the front edge of bar C.

The ends of the front bar D are bent or curved downward, so as to be below the level of the bar C; and through the ends of bar D the standards F of caster-wheels G' pass, the standards being allowed to turn freely in the ends of the bar D, the latter resting on shoulders $f$ on the standards. The upper ends of the standards F pass through the front ends of arms $g$, which project forward from the ends of the bar C, the upper ends of the standards, above the arms $g$, having nuts $i$ on them. The bar D is braced by bars $j\ j$ from the bar C. The bar C is provided with two pendent arms G G, one near each end. These arms G are perforated with holes $k$, at equal distances apart, and said arms are braced by rods $l$ from the bar D.

H H' represent iron plough-beams, two pairs, the beams of each pair being connected at their front ends, and gradually diverging from each other, from their front to their rear ends, the innermost beam H' being rather shorter than the outermost one, H, and the rear ends of both curved downward in semicircular form, to serve as standards, to which ploughs I are attached, as shown clearly in fig. 1. The front ends of each pair of beams H H' are attached by bolts $n$ to the pendent arms G, said bolts passing through higher or lower holes $k$ in said arms, as occasion may require. Each pair of beams H H' is connected by a rod, $o$, to secure them at a proper distance apart, and these rods $o$ connect frames I$^\times$ to the beams, said frames being connected to the bar E by bolts $p$, which pass through slots $q$ in bar E. These bolts $p$ are fitted on the inner ends of the rods $o$, and by means of these frames and bolts the plough-beams may be adjusted laterally, as occasion may require, to suit the width of the spaces between them.

Each pair of plough-beams H H' is provided with handles J J', which are braced by bars K.

This implement is under the complete control of the operator, and the ploughs may be adjusted laterally, to conform to the sinuosities of the rows of plants, without any difficulty whatever.

The team is attached to a draw-bolt, L, secured in a cross-bar on the beams A A, at the rear of the draught-pole, whereby the pull of the team is not allowed to interfere with the standard F of the implement, either in adjusting the ploughs laterally, or raising or lowering them.

I claim as new, and desire to secure by Letters Patent—

1. The slide-bolt E, applied to the draught-pole B, and arranged in relation with the cross-bar C, to operate in the manner substantially as and for the purpose set forth.

2. The arrangement of the front bar D with the standards F of the caster-wheels $G^\times$, and the arms $g$ of the cross-bar C, substantially as and for the purpose set forth.

3. The cross-bar C, provided with the pendent arms G, in combination with the plough-beams H H' and adjustable frames I, all arranged substantially as and for the purpose specified.

4. The stay or brace-bars $j\,j$, in connection with the bars C D, and the standards F of the caster-wheels G, all arranged substantially in the manner as and for the purpose set forth.

5. The bracing of the handles J J' by means of the bars K, substantially as set forth.

6. The placing of the draw-bolt L at the rear of the draught-pole, substantially as and for the purpose specified.

S. G. PEABOBY.

Witnesses:
   JOHN F. PEER,
   JOHN McKOWN.